United States Patent Office 3,301,840
Patented Jan. 31, 1967

3,301,840
PREPARATION OF POLYMERS OF CONJUGATED DIENES USING ORGANOLITHIUM/POLAR COMPOUND CATALYST SYSTEMS
Robert P. Zelinski, Bartlesville, Okla., assignor to Phillips Petroleum Company, a corporation of Delaware
No Drawing. Continuation of application Ser. No. 718,484, Mar. 3, 1958. This application Sept. 17, 1964, Ser. No. 397,271
19 Claims. (Cl. 260—94.2)

This application is a continuation of copending application Serial No. 718,484 filed March 3, 1958, now abandoned.

This invention relates to a method for polymerizing conjugated dienes. In one aspect, the invention relates to a method for controlling the ratio of cis to vinyl linkages in conjugated diene polymers.

Recently, considerable interest has been shown in the development of specific catalyst systems which are capable of producing polymers having a desired configuration. The term "sterospecific catalyst" has been used to describe such catalyst systems. It has been known for a number of years that n-butyllithium can be used as a catalyst in the polymerization of a conjugated diene, such as 1,3-butadiene. When butadiene is polymerized in a hydrocarbon solvent in the presence of n-butyllithium, approximately 80 to 85 percent or more of the polymer is formed by 1,4-addition of the monomer unit. A greater proportion of the 1,4-linkages are of the trans type rather than of the cis type.

It is an object of this invention to provide a novel process for polymerizing conjugated dienes to rubbery polymers of controlled cis-vinyl linkage ratios.

Another object of the invention is to provide a process for polymerizing conjugated dienes to rubbery polymers at an increased reaction rate.

A further object of the invention is to provide a process for preparing a novel block polymer.

Other and further objects and advantages of the invention will become apparent to those skilled in the art upon consideration of the accompanying disclosure.

The instant invention resides in the discovery of a process whereby conjugated dienes can be polymerized to rubbery polymers of a desired cis-vinyl ratio. Broadly speaking, the process comprises contacting a conjugated diene with an organolithium compound in the presence of a solvent mixture comprising a hydrocarbon selected from the group consisting of aromatic, paraffinic and cycloparaffinic hydrocarbons and a polar compound. In general, the polar compound used in the solvent mixture is one which does not inactivate the organolithium compound. It has been found that by adjusting the amount of the polar compound contained in the solvent mixture, it is possible to obtain a diene polymer having a desired ratio of cis 1,4-linkages to vinyl linkages (1,2). It has also been discovered that by carrying out the polymerization in the presence of a multi-component solvent mixture in which one of the components is a polar compound, the reaction rate of the organolithium catalyzed polymerization is greatly increased.

The instant invention in one aspect is also concerned with the production of novel block polymers of conjugated dienes. In accordance with this embodiment, the process includes the steps of initially contacting a conjugated diene with an organolithium compound in the presence of a hydrocarbon solvent, and thereafter, while the polymerization is still proceeding, adding a polar compound, which does not inactivate the organolithium compound, to the reaction mixture. The resulting polymer produced is formed of segments or blocks, and the cis-trans-vinyl ratio of one block varies from that of another. For example, when 1,3-butadiene is polymerized to less than 100 percent conversion in the presence of a hydrocarbon solvent only, a polymer block is formed in which the cis-trans-vinyl ratio is about 40–50–10. A polar compound, such as 1,2-dimethoxyethane, is then added to the reaction mixture, and the polymerization is allowed to proceed. A polymer block having a cis-trans-vinyl ratio of about 10–10–80 is thereby formed onto the end of the first-formed polymer block.

The monomeric material polymerized to produce rubbery polymers by the process of this invention comprises conjugated diene containing from 4 to 10, inclusive, carbon atoms. Examples of conjugated dienes which can be used include 1,3-butadiene, 2-methyl-1,3-butadiene (isoprene), 2,3 - dimethyl - 1,3-butadiene, 2-methyl-1,3-pentadiene, 2,3 - dimethyl - 1,3-pentadiene, 2-methyl-3-pentadiene, 2-phenylbutadiene, and the like. It is to be understood that mixtures of the aforementioned conjugated dienes can be polymerized in accordance with the process of this invention.

As mentioned hereinabove, the polymerization is carried out in the presence of a solvent mixture comprising a hydrocarbon selected from the group consisting of aromatic, paraffinic and cycloparaffinic hydrocarbons and a polar solvent which does not inactivate the organolithium compound utilized as the catalyst. The solvent mixture is one which is liquid and inert under conditions of the process. Examples of suitable aromatic hydrocarbons, paraffins and cycloparaffins which can be used as one of the components of the two-component solvent mixture include benzene, toluene, xylene, ethylbenzene, isobutane, n-pentane, isooctane, n-decane, cyclopentane, methylcyclopentane, dimethylcyclopentane, ethylcyclopentane, cyclohexane, methylcyclohexane, dimethylcyclohexane, and the like. Mixtures of these solvents can also be employed. Examples of polar compounds which do not inactivate the organolithium catalyst and which may, therefore, be utilized as the second component of the solvent mixture are ethers, thioethers (sulfides), and tertiary amines. Specific examples of such polar materials include dimethyl ether, diethyl ether, ethyl methyl ether, ethyl propyl ether, di-n-propyl ether, di-n-octyl ether, divinyl ether, tetramethylene oxide (tetrahydrofuran), 1,2-dimethoxyethane, dioxane, paraldehyde, anisole, dibenzyl ether, diphenyl ether, dimethyl sulfide, diethyl sulfide, di-n-propyl sulfide, di-n-butyl sulfide, dimethylethylamine, tri-n-propylamine, tri-n-butylamine, trimethylamine, triethylamine, N,N-dimethylaniline, N-ethylpiperidine, N-methyl-N-ethylaniline, N-methylmorpholine, and the like. It is to be understood that mixtures of these polar compounds can also be employed in the practice of the instant invention.

The amount of polar compound contained in the two-component solvent mixture is in the range of 0.005 to 50 weight percent of the total solvent mixture. The remainder of the solvent mixture is a paraffinic, cycloparaffinic or aromatic hydrocarbon as described hereinabove. It has been found that very small amounts of the polar compounds, e.g., as little as one weight percent or less, have an effect on the ratio of cis-1,4 linkages to vinyl linkages in the conjugated diene polymer. In general, it can be stated that the more active polar compounds, such as tetrahydrofuran and 1,2-dimethoxyethane, exert an effect on the polymer configuration when present at less than the molar concentrations of the alkyllithium. In the case of the less active polar materials, they must be present in excess of the molar concentrations of alkyllithium before a change in polymer structure can be detected.

The organolithium compound used as the catalyst in the practice of the process of this invention corresponds to the general formula RLi, wherein R is selected from the group consisting of alkyl, aryl, cycloalkyl, aralkyl, alkaryl, alkylcycloalkyl and cycoalkylalkyl radicals. The R group preferably contains from 1 to 10, inclusive, carbon atoms. Examples of organolithium compounds which can be used include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, and the like.

The polymerization process of this invention can be carried out at any temperature within the range of about −80 to 150° C., but it is preferred to operate in the range of −20 to 80° C. The polymerization reaction can be carried out under autogenous pressures. It is usually desirable to operate at pressures sufficient to maintain the monomeric material substantially in the liquid phase. The pressure will thus depend upon the particular material being polymerized, the solvent mixture being employed, and the temperature at which the polymerization is carried out. However, higher pressures can be employed if desired, these pressures being obtained by some such suitable method as the pressurization of the reactor with a gas which is inert with respect to the polymerization reaction.

The amount of the organolithium compound which is employed in the polymerization of the conjugated dienes can vary over a wide range. In general, the amount should be at least 0.02 part per 100 parts of the monomer to be polymerized, both amounts being on a weight basis. It is usually preferred to utilize an amount in the range of 0.02 to 2 parts by weight of the organolithium compound by 100 parts by weight of the total monomer charge. The upper limit for the amount of the organolithium compound to be employed depends largely upon the desired inherent viscosity of the polymer obtained in the polymerization. The inherent viscosity of the polymer produce decreases with increasing amounts of the organolithium catalyst. For example, in the case of butyllithium, a desirable catalyst level is from 0.15 to 0.20 part by weight of organolithium per 100 parts by weight of the conjugated diene charged to the reaction zone. It has been found that such a catalyst level produces a polymer having an inherent viscosity of from 2.0 to 2.25. A polymer of such an inherent viscosity has been determined to have a Mooney viscosity (ML–4) of approximately 25 to 35, a very desirable Mooney viscosity range.

As previously indicated, the process of this invention is concerned with production of rubbery polymers of conjugated dienes. The term "rubbery polymer" includes elastomeric, vulcanizable polymeric material which after vulcanization, i.e., crosslinking, possesses the properties normally associated with vulcanized rubber including materials which when compounded and cured exhibit reversible extensibility at 80° F. of over 100 percent of a specimen's original length with a retraction of at least 90 percent within 1 minute after release of the stress necessary to elongate to 100 percent. The rubbery polymers produced in accordance with this invention are linear, soluble polymers. With regard to the solubility of the rubbery polymers of this invention, it is preferred that they contain less than 50 percent gel as determined by the standard gel determination test. Actually, it has been found that polymers produced in accordance with the instant process generally contain no gel or substantially no gel.

The process of this invention can be carried out as a batch process by charging the monomeric material into a reactor containing the organolithium catalyst and the solvent mixture. The process can also be carried out continuously by maintaining the above-mentioned concentrations of reactants in the reactor for a suitable residence time. The residence time in a continuous process will, of course, vary within rather wide limits depending upon such variables as reaction temperature, pressure, the amount of catalyst used, and a monomeric material which is being polymerized. In a continuous process, the residence time generally falls within the range of 1 second to 1 hour when conditions within the specified ranges are employed. When a batch process is being utilized, the time for the reaction can be as high as 24 hours or more although it is generally less than 24 hours.

Various materials are known to be destructive to the organolithium catalyst of this invention. These materials include carbon dioxide, oxygen, water, alcohols, mercaptans, and primary and secondary amines. It is highly desirable, therefore, that the monomers be freed of these materials, as well as other materials which tend to inactivate the catalyst. Any of the known means for removing such contaminants can be used. Also, it is preferred that the solvent mixture used in the process be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. However, the amount of water which may be tolerated in the mixture is insufficient to completely deactivate the catalyst.

At the completion of the polymerization reaction, when a batch process is used, the total reaction mixture is then treated to inactivate the catalyst by adding a catalyst-inactivating material such as water, an alcohol, e.g., ethyl alcohol or isopropyl alcohol, an organic or inorganic acid, or the like. It is generally preferred to add only an amount of the catalyst inactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. It is to be understood that deactivation of the catalyst and precipitation of the polymer can be accomplished in a single step. The precipitated polymer can then be recovered by filtration, decantation, or the like. In order to further purify the rubbery polymer, the separated polymer can be redissolved in a suitable solvent and then again precipitated by the addition of an alcohol. Thereafter, the polymer is again recovered by a suitable separation means, as indicated hereinbefore, and then dried. Any suitable hydrocarbon solvent can be used in this purification step to redissolve the polymer. When the process of the invention is carried out continuously, the total effluent from the reactor is pumped from the reactor to a catalyst-inactivating zone wherein the reactor effluent is contacted with a suitable catalyst-inactivating material, such as an alcohol. When an alcohol is used as the catalyst-inactivating material, it can also function to precipitate the polymer. In the event other catalyst-inactivating materials are employed which do not perform this dual rule, it is also necessary to add a suitable material, such as an alcohol, to precipitate the polymer. After separation from the solvent mixture and alcohol by filtration or other suitable means, the polymer is dried. The rubbery polymer can also be redissolved in a suitable diluent and again precipitated, as described above, in order to purify the material. The solvent mixture and alcohol can in all cases be separated, for example by fractional distillation, and reused in the process. As hereinbefore mentioned, it is within the scope of the invention to utilize an antioxidant in the process to prevent oxidation of the rubbery polymer. The antioxidant can be added to the reaction mixture prior to precipitation of the polymer, to the solution of redissolved polymer or to the solvent in which the polymer is to be subsequently redissolved.

The rubbery polymers which result when a monomeric material comprising a conjugated diene is polymerized by the method of this invention can be compounded by any of the known methods such as have been used in the past for compounding natural rubber. Vulcanization accelerators, reinforcing agents, and fillers such as have been employed in natural rubber can likewise be used in compounding the polymers of this invention.

A more comprehensive understanding of the invention can be obtained by referring to the following illustrative examples which are not intended, however, to be unduly limitative of the invention.

*Example I*

Several runs were made in which 1,3-butadiene was polymerized to a rubbery polymer using n-butyllithium as the polymerization catalyst.

The n-butyllithium solutions used in these runs were prepared in the following manner. A 1000 milliliter 3-necked flask, fitted with a reflux condenser, a dropping funnel with a gas outlet side arm, and a high speed stirrer, was swept with prepurified nitrogen and charged with 200 milliliters of dry, olefin-free petroleum ether and 3.8 grams of lithium wire which had been cut into lengths of about 0.5 centimeter. The dropping funnel was then attached, and a solution of 23 grams of 1-chlorobutane in 100 milliliters of petroleum ether was charged to the dropping funnel. The stirrer was then started and brought to a high speed, and without cooling about 10 to 15 milliliters of the chlorobutane solution was added in one portion. After the reaction had started, as evidenced by the evolution of heat, a cooling bath was placed around the flask, and the remainder of the chlorobutane solution was added at the rate of 1 to 2 milliliters per minute. The addition of the chlorobutane solution was accomplished with very vigorous stirring. After the addition was completed, stirring and cooling was continued for from 30 to 45 minutes. The contents of the flask were then transferred to a container by a suitable suction arrangement through ⅛ inch stainless steel tubing. The container was then centrifuged and the supernatant n-butyllithium solution was carefully pressured into a dry, nitrogen-filled bottle. Analysis showed the solution to be about 0.47 molar with respect to butyllithium.

The polymerization runs were conducted in 7 and 12-ounce beverage bottles which were first charged with the appropriate amount of dried reaction solvent. Prepurified nitrogen was dispersed through a fritted glass tube and bubbled through the solvent at the rate of 3 liters per minute for from 3 to 20 minutes. For 10 to 20 gram monomer charges the bottles were first capped with rubber gaskets and metal caps, and the monomer and butyllithium were introduced in that order by means of a syringe. Larger monomer charges were weighed in before the capping operation. The charged bottles were then agitated in constant temperature baths for the required time.

To terminate the polymerizations, 50 to 100 milliliters of a benzene or toluene solution containing about 5 weight percent isopropyl alcohol and 2 weight percent beta-naphthylamine was added. The amine was added as an antioxidant while the alcohol was added in order to inactivate the catalyst. The rubbery polymer was then precipitated by adding an excess of isopropyl alcohol after which the polymer was recovered and dried in a vacuum oven. The following are the polymerization recipes which were employed in these runs.

|  | Parts by Weight | |
| --- | --- | --- |
|  | A | B |
| Butadiene | 100 | 100 |
| Benzene | 440 |  |
| n-Butyllithium | 0.32 | 0.32–0.64 |
| Diethyl ether | 0–80 | 357 |
| Temperature, °C | 50 | 50 |
| Time, hours | 4 | 4 |

The results of the several runs, including the results of an infrared analysis of the polymer products, are shown hereinbelow in Table I.

TABLE I

| Run No. | Recipe | Butyllithium | | Diethyl Ether, Parts by Wt. | Conversion, Percent | Inherent Viscosity | Unsat., Percent | Configuration, Percent [1] | | |
| --- | --- | --- | --- | --- | --- | --- | --- | --- | --- | --- |
|  |  | Parts by Wt. | Milli-moles |  |  |  |  | Cis | Trans | Vinyl |
| 1 | A | 0.32 | 5.0 | 0 | 98 | 0.97 | 97.1 | 36.0 | 51.5 | 12.5 |
| 2 | A | 0.32 | 5.0 | 5 | 98 | 0.79 | 86.6 | 33.5 | 55.0 | 11.5 |
| 3 | A | 0.32 | 5.0 | 10 | 100 | 0.95 | 95.1 | 18.5 | 44.0 | 37.5 |
| 4 | A | 0.32 | 5.0 | 20 | 98 | 0.87 | 95.2 | 16.5 | 41.5 | 42.0 |
| 5 | A | 0.32 | 5.0 | 40 | 98 | 0.94 | 93.8 | 17.0 | 38.5 | 44.5 |
| 6 | A | 0.32 | 5.0 | 80 | 98 | 0.89 | 93.3 |  |  |  |
| 7 | B | 0.64 | 10.0 | 357 | 100 | 0.43 | 85.0 |  |  |  |
| 8 | B | 0.32 | 5.0 | 357 | 93 | 1.02 | 92.2 | 12.0 | 30.5 | 57.5 |

[1] Method used in infrared examination was essentially the same as that set forth in "The Analysis of Natural and Synthetic Rubbers by Infrared Spectroscopy," H. L. Dinsmore and D. C. Smith in Naval Research Laboratory Report No. P–2861, August 20, 1964.

The polymers produced in the above runs contained no gel. While all of the polymerizations were carried out for four hours, it was noted that the runs containing ether polymerized much faster than the run in which the hydrocarbon alone was used as the solvent.

*Example II*

Another series of runs was carried out in which essentially the same procedure was employed as described hereinabove in Example I. In these runs, however, triethylamine was employed as the polar compound instead of diethyl ether and the hydrocarbon used in the solvent mixture was cyclohexane.

The polymerization recipe employed in the runs of this example was as follows:

```
                                          Parts by weight, C
Butadiene _____ 100
Cyclohexane _____ 390
N-Butyllithium _____ 0.32
Triethylamine _____ 0–80
Temperature, °C _____ 50
Time, hours _____ 16
```

The results of these runs, including the results of the infrared analysis of the polymer products, are set forth hereinbelow in Table II.

TABLE II

| Run No. | Recipe | Triethylamine, phm. | Conversion, percent | Inherent Viscosity | Unsaturation, percent | Configuration, percent [1] | | |
|---|---|---|---|---|---|---|---|---|
| | | | | | | Cis | Trans | Vinyl |
| 10 | C | 0 | 97 | 0.67 | 96.8 | 32.5 | 54.5 | 13.0 |
| 11 | C | 5 | 95 | 0.66 | | | | |
| 12 | C | 10 | 95 | 0.58 | 94.8 | 24.0 | 46.5 | 29.5 |
| 13 | C | 20 | 92 | 0.65 | | | | |
| 14 | C | 40 | 92 | 0.77 | 93.7 | 14.5 | 40.5 | 45.0 |
| 15 | C | 80 | 39 | 0.50 | | | | |

[2] See note under Table I.

Example III

A number of polymerization runs were carried out in which 1,3-butadiene was polymerized to a rubbery polymer in the presence of n-butyllithium, prepared as described in Example I. These polymerization runs were carried out according to the procedure of Example I and the following polymerization recipe:

RECIPE

| | Parts by weight except as noted |
|---|---|
| Cyclohexane | 780 |
| 1,3-butadiene | 100 |
| Polar compound | Variable |
| n-Butyllithium | millimole 4.0 |
| Time | Variable |
| Temperature, °C. | 50 |

In each of these runs, the various reactants were charged to the polymerization bottle in the order: cyclohexane, butadiene, polar compound and n-butyllithium. Two different polar compounds were employed, namely tetrahydrofuran and 1,2-dimethoxyethane. In the runs employing tetrahydrofuran, the tetrahydrofuran was charged as a 1% by volume solution in cyclohexane.

The results of these runs are shown below in Table III.

TABLE III

| Run Number | Polar Compound Employed | Parts by Wt. Polar Compound | Polymerization Time, Hours | Conversion, Percent | Configuration [1] | | |
|---|---|---|---|---|---|---|---|
| | | | | | Cis | Trans | V'nyl |
| 16 | Tetrahydrofuran | 0.1 | 0.5 | 54 | 35 | 51.2 | 13.8 |
| 17 | do | 0.2 | 20 | 100 | 32.1 | 47.7 | 20.2 |
| 18 | do | 0.5 | 20 | 100 | 28.1 | 44.1 | 27.8 |
| 19 | do | 1 | 72 | 100 | 15 | 30 | 55 |
| 20 | do | 5 | 72 | 100 | 15 | 20 | 65 |
| 21 | do | 15 | 72 | 100 | 15 | 10 | 75 |
| 22 | do | 25 | 72 | 100 | 6 | 9 | 85 |
| 23 | 1,2-dimethoxyethane | 1.0 | 20 | 100 | Not determined | | |
| 24 | do | 0.5 | 20 | 100 | Not determined | | |
| 25 | do | 0.2 | 20 | 100 | 15.6 | 22.6 | 61.8 |
| 26 [2] | do | 0.2 | 1.5 | 76 | 10.4 | 14.8 | 74.8 |
| 27 [2] | do | 25 | 1.5 | 93 | 11.7 | 11.9 | 76.4 |
| 28 [3] | do | 25 | 1.5 | 95 | 8.3 | 8.3 | 83.4 |

[1] See note under Table I.
[2] Polymerization temperature 30° C.
[3] Polymerization temperature 5° C.

From the data set forth in Tables I, II and III hereinabove, it is seen that the ratio of cis-1,4 linkages to vinyl linkages can be controlled by varying the amount of the polar compound contained in the solvent mixture.

The rubbery polymers produced in accordance with this invention have utility in applications where natural and synthetic rubbers are used. For example, they can be used in the manufacture of automobile tires, gaskets, and other rubber articles. The polymers are also useful in applications requiring polymers of low ash content, and they can be used as an electrical insulating material.

As will be evident to those skilled in the art, many variations and modifications can be practiced upon consideration of the foregoing disclosure. Such variations and modifications are believed to be within the spirit and scope of the invention.

I claim:

1. A process for preparing a rubbery homopolymer of 1,3-butadiene which comprises contacting a monomer consisting essentially of 1,3-butadiene with a catalyst consisting essentially of at least 0.02 part by weight per 100 parts by weight of said 1,3-butadiene of an organolithium compound corresponding to the formula RLi, wherein R is a radical selected from the group consisting of alkyl, aryl, cycloalkyl, aralkyl, alkaryl, alkylcycloalkyl, and cycloalkylakyl, said contacting occurring in the range of —80° to 150° C. and in the presence of a solvent mixture, inert and liquid under conditions of the process, said solvent mixture consisting essentially of (1) a hydrocarbon selected from the group consisting of aromatic, paraffinic and cycloparaffinic hydrocarbons and (2) a polar compound selected from the group consisting of ethers, thioethers and tertiary amines, the amount of said polar compound in said mixture being in the range of 0.005 to 50 weight percent of the total mixture; and recovering a rubbery homopolymer of said 1,3-butadiene.

2. The process according to claim 1 in which the amount of said organolithium compound is in the range of 0.02 to 2.0 parts by weight per 100 parts by weight of said 1,3-butadiene.

3. The process according to claim 1 in which said organolithium compound is butyllithium and the amount of said butyllithium is in the range of 0.15 to 0.20 part by weight per 100 parts by weight of said 1,3-butadiene.

4. A process for preparing rubbery homopolymers of 1,3-butadiene having a desired ratio of cis 1,4-linkages to vinyl linkages which comprises contacting a monomer consisting essentially of 1,3-butadiene with a catalyst consisting essentially of at least 0.02 part by weight per 100 parts by weight of said 1,3-butadiene of an organolithium compound corresponding to the formula RLi, wherein R is a radical selected from the group consisting of alkyl, aryl, cycloalkyl, aralkyl, alkaryl, alkylcycloalkyl and cycloalkylalkyl, said contacting occurring at a temperature in the range of —80 to 150° C. and in the presence of a solvent mixture, inert and liquid under conditions of the process, said solvent mixture consisting essentially of (1) a hydrocarbon selected from the group consisting of aromatic, paraffinic and cycloparaffinic hydrocarbons, and (2) a polar compound selected from the group consisting of ethers, thioethers and tertiary amines, the amount of said polar compound in said mixture being in the range of 0.005 to 50 weight percent of the total mixture; adjusting the amount of said polar compound in said mixture so as to obtain a polymer product having a desired ratio of cis 1,4-linkages to vinyl linkages; and recovering the rubbery homopolymer of said 1,3-butadiene so produced.

5. A process for preparing a rubbery homopolymer of 1,3-butadiene having a desired ratio of cis 1,4-linkages to vinyl linkages which comprises contacting said butadiene with a catalyst consisting essentially of in the range of 0.15 to 0.20 part by weight per 100 parts by weight of butadiene of n-butyllithium, said contacting occurring at a temperature in the range of −80 to 150° C. and in the presence of a solvent mixture, inert and liquid under conditions of the process, said solvent mixture consisting essentially of cyclohexane and dioxane, the amount of dioxane in said mixture being in the range of 0.005 to 50 weight percent of the total mixture; adjusting the amount of dioxane in said solvent mixture so as to obtain a polymer product having a desired ratio of cis 1,4-linkages to vinyl linkages; and recovering the rubbery homopolymer of butadiene so produced.

6. A process for preparing rubbery homopolymers of conjugated dienes which comprises contacting a monomer consisting essentially of an aliphatic conjugated diene containing from 4 to 10, inclusive, carbon atoms per molecule with a catalyst consisting essentially of at least 0.02 part by weight per 100 parts by weight of said conjugated diene of an organolithium compound corresponding to the formula RLi, wherein R is a radical selected from the group consisting of alkyl, aryl, cycloalkyl, aralkyl, alkaryl, alkylcycloalkyl, and cycloalkylalkyl, said contacting occurring in the range of −80 to 150° C. and in the presence of a solvent mixture, inert and liquid under conditions of the process, said solvent mixture consisting essentialy of benzene and diethyl ether, the amount of said diethyl ether in said mixture being in the range of 0.005 to 50 weight percent of the total mixture; and recovering a rubbery homopolymer of said conjugated diene.

7. A process for preparing rubbery homopolymers of conjugated dienes which comprises contacting a monomer consisting essentially of an aliphatic conjugated diene containing from 4 to 10, inclusive, carbon atoms per molecule with a catalyst consisting essentially of at least 0.02 part by weight per 100 parts by weight of said conjugated diene of an organolithium compound corresponding to the formula RLi, wherein R is a radical selected from the group consisting of alkyl, aryl, cycloalkyl, aralkyl, alkaryl, alkylcycloalkyl, and cycloalkylalkyl, said contacting occurring in the range of −80 to 150° C. and in the presence of a solvent mixture, inert and liquid under conditions of the process, said solvent mixture consisting essentially of cyclohexane and diethyl ether, the amount of said diethyl ether in said mixture being in the range of 0.005 to 50 weight percent of the total mixture; and recovering a rubbery homopolymer of said conjugated diene.

8. A process for preparing rubbery homopolymers of conjugated dienes which comprises contacting a monomer consisting essentially of an aliphatic conjugated diene containing from 4 to 10, inclusive, carbon atoms per molecule with a catalyst consisting essentially of at least 0.02 part by weight per 100 parts by weight of said conjugated diene of an organolithium compound corresponding to the formula RLi, wherein R is a radical selected from the group consisting of alkyl, aryl, cycloalkyl, aralkyl, alkaryl, alkylcycloalkyl, and cycloalkylalkyl, said contacting occurring in the range of −80 to 150° C. and in the presence of a solvent mixture, inert and liquid under conditions of the process, said solvent mixture consisting essentially of cyclohexane and triethylamine, the amount of said triethylamine in said mixture being in the range of 0.005 to 50 weight percent of the total mixture; and recovering a rubbery homopolymer of said conjugated diene.

9. A process for preparing rubbery homopolymers of conjugated dienes which comprises contacting a monomer consisting essentially of an aliphatic conjugated diene containing from 4 to 10, inclusive, carbon atoms per molecule with a catalyst consisting essentially of at least 0.02 part by weight per 100 parts by weight of said conjugated diene of an organolithium compound corresponding to the formula RLi, wherein R is a radical selected from the group consisting of alkyl, aryl, cycloalkyl, aralkyl, alkaryl, alkylcycloalkyl, and cycloalkylalkyl, said contacting occurring in the range of −80 to 150° C. and in the presence of a solvent mixture, inert and liquid under conditions of the process, said solvent mixture consisting essentially of cyclohexane and 1,2-dimethoxyethane, the amount of said dimethoxyethane in said mixture being in the range of 0.005 to 50 weight percent of the total mixture; and recovering a rubbery homopolymer of said conjugated diene.

10. A process for preparing rubbery homopolymers of conjugated dienes which comprises contacting a monomer consisting essentially of an aliphatic conjugated diene containing from 4 to 10, inclusive, carbon atoms per molecule with a catalyst consisting essentially of at least 0.02 part by weight per 100 parts by weight of said conjugated diene of an organolithium compound corresponding to the formula RLi, wherein R is a radical selected from the group consisting of alkyl, aryl, cycloalkyl, aralkyl, alkaryl, alkylcycloalkyl, and cycloalkylalkyl, said contacting occurring in the range of −80 to 150° C. and in the presence of a solvent mixture, inert and liquid under conditions of the process, said solvent mixture consisting essentially of cyclohexane and tetrahydrofuran, the amount of said tetrahydrofuran in said mixture being in the range of 0.005 to 50 weight percent of the total mixture; and recovering a rubbery homopolymer of said conjugated diene.

11. A process for preparing a block polymer by catalytic polymerization which comprises polymerizing a monomer consisting essentially of an aliphatic conjugated diene containing from 4 to 10, inclusive, carbon atoms per molecule with a catalyst consisting essentially of at least 0.02 part by weight per 100 parts by weight of said conjugated diene of an organolithium compound corresponding to the formula RLi, wherein R is a radical selected from the group consisting of alkyl, aryl, cycloalkyl, aralkyl, alkaryl, alkylcycloalkyl and cycloalkylalkyl, said contacting occurring at a temperature in the range of −80 to 150° C. and in the presence of a solvent, inert and liquid under conditions of the process, said solvent consisting essentially of a hydrocarbon selected from the group consisting of aromatic, paraffinic and cycloparaffinic hydrocarbons; while said polymerization is proceeding, adding a polar compound to said hydrocarbon solvent in an amount to provide a mixture containing in the range of 0.005 to 50 weight percent of said polar compound, said polar compound being selected from the group consisting of ethers, thioethers and tertiary amines; allowing said polymerization to proceed in the presence of said hydrocarbon solvent and said polar compound; and recovering the block polymer so produced.

12. The process for preparing a block homopolymer of a 1,3 diene which comprises polymerizing 1,3 diene with a catalyst consisting of a lithium hydrocarbon in a hydrocarbon solvent selected from aromatic, paraffinic, and cycloparaffinic hydrocarbons and then without inactivating the organolithium catalyst polymerizing the resultant polymer with additional 1,3 diene monomer in a solvent system consisting of said hydrocarbon solvent plus 0.005 to 50 weight percent of an organic compound selected from the group consisting of ethers, thioethers and tertiary amines and in the absence of additional lithium hydrocarbon.

13. The process of claim 12 in which the diene is 1,3-butadiene.

14. The process of claim 13 in which the lithium hydrocarbon is n-butyllithium.

15. The process of claim 14 in which the organic compound is tetrahydrofuran.

16. The process of claim 12 in which the monomer is isoprene.

17. A block homopolymer of a 1,3 diene as prepared by the process of claim 12.

18. A block homopolymer of isoprene as prepared by the process of claim 12.

19. A block homopolymer of butadiene as prepared by the process of claim 12.

References Cited by the Examiner

UNITED STATES PATENTS 3,140,278  7/1964  Kuntz _____ 260—94.2

OTHER REFERENCES

Hsieh et al.: "Polymerization of Isoprene by n-Butyl Lithium," Journal of Polymer Science, volume XXV, issue No. 109, July 1957, copy in Group 140, pp. 245–247.

JOSEPH L. SCHOFER, *Primary Examiner.*

C. R. REAP, H. WONG, *Assistant Examiners.*